United States Patent
Campbell et al.

(10) Patent No.: US 10,466,119 B2
(45) Date of Patent: Nov. 5, 2019

(54) RUGGEDIZED WAFER LEVEL MEMS FORCE SENSOR WITH A TOLERANCE TRENCH

(71) Applicant: NextInput, Inc., San Jose, CA (US)

(72) Inventors: Ian Campbell, San Jose, CA (US); Ryan Diestelhorst, San Jose, CA (US); Dan Benjamin, San Jose, CA (US); Steven S. Nasiri, Los Altos Hills, CA (US)

(73) Assignee: NEXTINPUT, INC., Mountain View, CA (US)

(*) Notice: Subject to any disclaimer, the term of this patent is extended or adjusted under 35 U.S.C. 154(b) by 397 days.

(21) Appl. No.: 15/178,976

(22) Filed: Jun. 10, 2016

(65) Prior Publication Data

US 2016/0363490 A1    Dec. 15, 2016

Related U.S. Application Data (60) Provisional application No. 62/173,420, filed on Jun. 10, 2015.

(51) Int. Cl.
*G01L 25/00* (2006.01)
*G01L 1/18* (2006.01)
*G01L 1/26* (2006.01)

(52) U.S. Cl.
CPC . *G01L 1/18* (2013.01); *G01L 1/26* (2013.01)

(58) Field of Classification Search
CPC ..... G01L 1/18; G01L 1/26; G01L 1/14; G01L 1/04; G01L 3/10; G01L 3/08; G01L 3/24; G01D 11/30; B60R 2021/01516
See application file for complete search history.

(56) References Cited

U.S. PATENT DOCUMENTS 4,594,639 A    6/1986  Kuisma
4,658,651 A    4/1987  Le
(Continued)

FOREIGN PATENT DOCUMENTS

CN    201653605 U    11/2010
CN    102998037 A     3/2013
(Continued)

OTHER PUBLICATIONS

Mei, T., et al., "Design and Fabrication of an Integrated Three-Dimensional Tactile Sensor for Space Robotic Applications," Micro Electro Mechanical Systems, MEMS '99, Twelfth IEEE International Conference, Orlando Florida, Jan. 21, 1999, pp. 112-117.
(Continued)

*Primary Examiner* — Harshad R Patel
*Assistant Examiner* — Nigel H Plumb
(74) *Attorney, Agent, or Firm* — Meunier Carlin & Curfman LLC (57) ABSTRACT

An example MEMS force sensor is described herein. The MEMS force sensor can include a cap for receiving an applied force and a sensor bonded to the cap. A trench and a cavity can be formed in the sensor. The trench can be formed along at least a portion of a peripheral edge of the sensor. The cavity can define an outer wall and a flexible sensing element, and the outer wall can be arranged between the trench and the cavity. The cavity can be sealed between the cap and the sensor. The sensor can also include a sensor element formed on the flexible sensing element. The sensor element can change an electrical characteristic in response to deflection of the flexible sensing element.

12 Claims, 5 Drawing Sheets

(56) References Cited

U.S. PATENT DOCUMENTS

| | | |
|---|---|---|
| 4,814,856 A | 3/1989 | Kurtz et al. |
| 4,914,624 A | 4/1990 | Dunthorn |
| 4,918,262 A | 4/1990 | Flowers et al. |
| 4,933,660 A | 6/1990 | Wynne |
| 4,983,786 A | 1/1991 | Stevens |
| 5,095,401 A | 3/1992 | Zavracky et al. |
| 5,159,159 A | 10/1992 | Asher |
| 5,237,879 A | 8/1993 | Speeter |
| 5,320,705 A | 6/1994 | Fujii et al. |
| 5,333,505 A | 8/1994 | Takahashi et al. |
| 5,343,220 A | 8/1994 | Veasy et al. |
| 5,349,746 A | 9/1994 | Gruenwald et al. |
| 5,351,550 A | 10/1994 | Maurer |
| 5,483,994 A | 1/1996 | Maurer |
| 5,510,812 A | 4/1996 | O'Mara et al. |
| 5,541,372 A | 7/1996 | Baller et al. |
| 5,543,591 A | 8/1996 | Gillespie et al. |
| 5,565,657 A | 10/1996 | Merz |
| 5,600,074 A | 2/1997 | Marek et al. |
| 5,673,066 A | 9/1997 | Toda et al. |
| 5,773,728 A | 6/1998 | Tsukada et al. |
| 5,889,236 A | 3/1999 | Gillespie et al. |
| 5,921,896 A | 7/1999 | Boland |
| 6,028,271 A | 2/2000 | Gillespie et al. |
| 6,159,166 A | 12/2000 | Chesney et al. |
| 6,243,075 B1 | 6/2001 | Fishkin et al. |
| 6,348,663 B1 | 2/2002 | Schoos et al. |
| 6,351,205 B1 | 2/2002 | Armstrong |
| 6,360,598 B1 | 3/2002 | Calame et al. |
| 6,437,682 B1 | 8/2002 | Vance |
| 6,555,235 B1 | 4/2003 | Aufderheide et al. |
| 6,556,189 B1 | 4/2003 | Takahata et al. |
| 6,569,108 B2 | 5/2003 | Sarvazyan et al. |
| 6,610,936 B2 | 8/2003 | Gillespie et al. |
| 6,620,115 B2 | 9/2003 | Sarvazyan et al. |
| 6,629,343 B1 | 10/2003 | Chesney et al. |
| 6,668,230 B2 | 12/2003 | Mansky et al. |
| 6,720,712 B2 | 4/2004 | Scott et al. |
| 6,788,297 B2 | 9/2004 | Itoh et al. |
| 6,801,191 B2 | 10/2004 | Mukai et al. |
| 6,809,280 B2 | 10/2004 | Divigalpitiya et al. |
| 6,812,621 B2 | 11/2004 | Scott |
| 6,822,640 B2 | 11/2004 | Derocher |
| 6,879,318 B1 | 4/2005 | Chan et al. |
| 6,888,537 B2 | 5/2005 | Benson et al. |
| 6,915,702 B2 | 7/2005 | Omura et al. |
| 6,931,938 B2 | 8/2005 | Knirck et al. |
| 6,995,752 B2 | 2/2006 | Lu |
| 7,138,984 B1 | 11/2006 | Miles |
| 7,173,607 B2 | 2/2007 | Matsumoto et al. |
| 7,190,350 B2 | 3/2007 | Roberts |
| 7,215,329 B2 | 5/2007 | Yoshikawa et al. |
| 7,218,313 B2 | 5/2007 | Marcus et al. |
| 7,224,257 B2 | 5/2007 | Morikawa |
| 7,245,293 B2 | 7/2007 | Hoshino et al. |
| 7,273,979 B2 | 9/2007 | Christensen |
| 7,280,097 B2 | 10/2007 | Chen et al. |
| 7,318,349 B2 | 1/2008 | Vaganov et al. |
| 7,324,094 B2 | 1/2008 | Moilanen et al. |
| 7,324,095 B2 | 1/2008 | Sharma |
| 7,336,260 B2 | 2/2008 | Martin et al. |
| 7,337,085 B2 | 2/2008 | Soss |
| 7,345,680 B2 | 3/2008 | David |
| 7,406,661 B2 | 7/2008 | Väänänen et al. |
| 7,425,749 B2 | 9/2008 | Hartzell et al. |
| 7,426,873 B1 | 9/2008 | Kholwadwala et al. |
| 7,449,758 B2 | 11/2008 | Axelrod et al. |
| 7,460,109 B2 | 12/2008 | Safai et al. |
| 7,476,952 B2 | 1/2009 | Vaganov et al. |
| 7,508,040 B2 | 3/2009 | Nikkel et al. |
| 7,554,167 B2 | 6/2009 | Vaganov |
| 7,607,111 B2 | 10/2009 | Vaananen et al. |
| 7,620,521 B2 | 11/2009 | Breed et al. |
| 7,629,969 B2 | 12/2009 | Kent |
| 7,649,522 B2 | 1/2010 | Chen et al. |
| 7,663,612 B2 | 2/2010 | Bladt |
| 7,685,538 B2 | 3/2010 | Fleck et al. |
| 7,698,084 B2 | 4/2010 | Soss |
| 7,701,445 B2 | 4/2010 | Inokawa et al. |
| 7,746,327 B2 | 6/2010 | Miyakoshi |
| 7,791,151 B2 | 9/2010 | Vaganov et al. |
| 7,819,998 B2 | 10/2010 | David |
| 7,825,911 B2 | 11/2010 | Sano et al. |
| 7,903,090 B2 | 3/2011 | Soss et al. |
| 7,921,725 B2 | 4/2011 | Silverbrook et al. |
| 7,952,566 B2 | 5/2011 | Poupyrev et al. |
| 7,973,772 B2 | 7/2011 | Gettemy et al. |
| 7,973,778 B2 | 7/2011 | Chen |
| 8,004,052 B2 | 8/2011 | Vaganov |
| 8,004,501 B2 | 8/2011 | Harrison |
| 8,013,843 B2 | 9/2011 | Pryor |
| 8,026,906 B2 | 9/2011 | Mölne et al. |
| 8,044,929 B2 | 10/2011 | Baldo et al. |
| 8,068,100 B2 | 11/2011 | Pryor |
| 8,072,437 B2 | 12/2011 | Miller et al. |
| 8,072,440 B2 | 12/2011 | Pryor |
| 8,113,065 B2 | 2/2012 | Ohsato et al. |
| 8,120,586 B2 | 2/2012 | Hsu et al. |
| 8,120,588 B2 | 2/2012 | Klinghult |
| 8,130,207 B2 | 3/2012 | Nurmi et al. |
| 8,134,535 B2 | 3/2012 | Choi et al. |
| 8,139,038 B2 | 3/2012 | Chueh et al. |
| 8,144,133 B2 | 3/2012 | Wang et al. |
| 8,149,211 B2 | 4/2012 | Hayakawa et al. |
| 8,154,528 B2 | 4/2012 | Chen et al. |
| 8,159,473 B2 | 4/2012 | Cheng et al. |
| 8,164,573 B2 | 4/2012 | DaCosta et al. |
| 8,183,077 B2 | 5/2012 | Vaganov et al. |
| 8,184,093 B2 | 5/2012 | Tsuiki |
| 8,188,985 B2 | 5/2012 | Hillis et al. |
| 8,199,116 B2 | 6/2012 | Jeon et al. |
| 8,212,790 B2 | 7/2012 | Rimas-Ribikauskas et al. |
| 8,237,537 B2 | 8/2012 | Kurtz et al. |
| 8,243,035 B2 | 8/2012 | Abe et al. |
| 8,250,921 B2 | 8/2012 | Nasiri et al. |
| 8,253,699 B2 | 8/2012 | Son |
| 8,260,337 B2 | 9/2012 | Periyalwar et al. |
| 8,269,731 B2 | 9/2012 | Mölne |
| 8,289,288 B2 | 10/2012 | Whytock et al. |
| 8,289,290 B2 | 10/2012 | Klinghult |
| 8,319,739 B2 | 11/2012 | Chu et al. |
| 8,325,143 B2 | 12/2012 | Destura et al. |
| 8,350,345 B2 | 1/2013 | Vaganov |
| 8,363,020 B2 | 1/2013 | Li et al. |
| 8,363,022 B2 | 1/2013 | Tho et al. |
| 8,378,798 B2 | 2/2013 | Bells et al. |
| 8,378,991 B2 | 2/2013 | Jeon et al. |
| 8,384,677 B2 | 2/2013 | Mak-Fan et al. |
| 8,387,464 B2 | 3/2013 | McNeil et al. |
| 8,405,631 B2 | 3/2013 | Chu et al. |
| 8,405,632 B2 | 3/2013 | Chu et al. |
| 8,421,609 B2 | 4/2013 | Kim et al. |
| 8,427,441 B2 | 4/2013 | Paleczny et al. |
| 8,436,806 B2 | 5/2013 | Almalki et al. |
| 8,436,827 B1 | 5/2013 | Zhai et al. |
| 8,451,245 B2 | 5/2013 | Heubel et al. |
| 8,456,440 B2 | 6/2013 | Abe et al. |
| 8,466,889 B2 | 6/2013 | Tong et al. |
| 8,477,115 B2 | 7/2013 | Rekimoto |
| 8,482,372 B2 | 7/2013 | Kurtz et al. |
| 8,493,189 B2 | 7/2013 | Suzuki |
| 8,497,757 B2 | 7/2013 | Kurtz et al. |
| 8,516,906 B2 | 8/2013 | Umetsu et al. |
| 2003/0067448 A1 | 4/2003 | Park |
| 2003/0189552 A1 | 10/2003 | Chuang et al. |
| 2004/0012572 A1 | 1/2004 | Sowden et al. |
| 2004/0140966 A1 | 7/2004 | Marggraff et al. |
| 2006/0028441 A1 | 2/2006 | Armstrong |
| 2006/0244733 A1 | 11/2006 | Geaghan |
| 2006/0272413 A1 | 12/2006 | Vaganov et al. |
| 2006/0284856 A1 | 12/2006 | Soss |
| 2007/0035525 A1 | 2/2007 | Yeh et al. |
| 2007/0046649 A1 | 3/2007 | Reiner |
| 2007/0070046 A1 | 3/2007 | Sheynblat et al. |

(56) References Cited

U.S. PATENT DOCUMENTS

| | | |
|---|---|---|
| 2007/0070053 A1 | 3/2007 | Lapstun et al. |
| 2007/0097095 A1 | 5/2007 | Kim et al. |
| 2007/0103449 A1 | 5/2007 | Laitinen et al. |
| 2007/0103452 A1 | 5/2007 | Wakai et al. |
| 2007/0115265 A1 | 5/2007 | Rainisto |
| 2007/0132717 A1 | 6/2007 | Wang et al. |
| 2007/0137901 A1 | 6/2007 | Chen |
| 2007/0139391 A1 | 6/2007 | Bischoff |
| 2007/0152959 A1 | 7/2007 | Peters |
| 2007/0156723 A1 | 7/2007 | Vaananen |
| 2007/0182864 A1 | 8/2007 | Stoneham et al. |
| 2007/0229478 A1 | 10/2007 | Rosenberg et al. |
| 2007/0235231 A1 | 10/2007 | Loomis et al. |
| 2007/0245836 A1* | 10/2007 | Vaganov ............... G01L 1/044 73/862.621 |
| 2007/0262965 A1 | 11/2007 | Hirai et al. |
| 2007/0277616 A1 | 12/2007 | Nikkel et al. |
| 2007/0298883 A1 | 12/2007 | Feldman et al. |
| 2008/0001923 A1 | 1/2008 | Hall et al. |
| 2008/0007532 A1 | 1/2008 | Chen |
| 2008/0010616 A1 | 1/2008 | Algreatly |
| 2008/0024454 A1 | 1/2008 | Everest |
| 2008/0030482 A1 | 2/2008 | Elwell et al. |
| 2008/0036743 A1 | 2/2008 | Westerman et al. |
| 2008/0088600 A1 | 4/2008 | Prest et al. |
| 2008/0088602 A1 | 4/2008 | Hotelling |
| 2008/0094367 A1 | 4/2008 | Van De Ven et al. |
| 2008/0105470 A1 | 5/2008 | Van De Ven et al. |
| 2008/0106523 A1 | 5/2008 | Conrad |
| 2008/0174852 A1 | 7/2008 | Hirai et al. |
| 2008/0180402 A1 | 7/2008 | Yoo et al. |
| 2008/0180405 A1 | 7/2008 | Han et al. |
| 2008/0180406 A1 | 7/2008 | Han et al. |
| 2008/0202249 A1 | 8/2008 | Yokura et al. |
| 2008/0204427 A1 | 8/2008 | Heesemans et al. |
| 2008/0211766 A1 | 9/2008 | Westerman et al. |
| 2008/0238446 A1 | 10/2008 | DeNatale et al. |
| 2008/0238884 A1 | 10/2008 | Harish |
| 2008/0259046 A1 | 10/2008 | Carsanaro |
| 2008/0284742 A1 | 11/2008 | Prest et al. |
| 2008/0303799 A1 | 12/2008 | Schwesig et al. |
| 2009/0027352 A1 | 1/2009 | Abele |
| 2009/0027353 A1 | 1/2009 | Im et al. |
| 2009/0046110 A1 | 2/2009 | Sadler et al. |
| 2009/0102805 A1 | 4/2009 | Meijer et al. |
| 2009/0140985 A1 | 6/2009 | Liu |
| 2009/0184921 A1 | 7/2009 | Scott et al. |
| 2009/0184936 A1 | 7/2009 | Algreatly |
| 2009/0213066 A1 | 8/2009 | Hardacker et al. |
| 2009/0237374 A1 | 9/2009 | Li et al. |
| 2009/0242282 A1 | 10/2009 | Kim et al. |
| 2009/0243817 A1 | 10/2009 | Son |
| 2009/0243998 A1 | 10/2009 | Wang |
| 2009/0256807 A1 | 10/2009 | Nurmi |
| 2009/0256817 A1 | 10/2009 | Perlin et al. |
| 2009/0282930 A1 | 11/2009 | Cheng et al. |
| 2009/0303400 A1 | 12/2009 | Hou et al. |
| 2009/0309852 A1 | 12/2009 | Lin et al. |
| 2009/0314551 A1 | 12/2009 | Nakajima |
| 2010/0013785 A1 | 1/2010 | Murai et al. |
| 2010/0020030 A1 | 1/2010 | Kim et al. |
| 2010/0020039 A1 | 1/2010 | Ricks et al. |
| 2010/0039396 A1 | 2/2010 | Ho et al. |
| 2010/0053087 A1 | 3/2010 | Dai et al. |
| 2010/0053116 A1 | 3/2010 | Daverman et al. |
| 2010/0066686 A1 | 3/2010 | Joguet et al. |
| 2010/0066697 A1 | 3/2010 | Jacomet et al. |
| 2010/0079391 A1 | 4/2010 | Joung |
| 2010/0079395 A1 | 4/2010 | Kim et al. |
| 2010/0079398 A1 | 4/2010 | Shen et al. |
| 2010/0097347 A1 | 4/2010 | Lin |
| 2010/0117978 A1 | 5/2010 | Shirado |
| 2010/0123671 A1 | 5/2010 | Lee |
| 2010/0123686 A1 | 5/2010 | Klinghult et al. |
| 2010/0127140 A1 | 5/2010 | Smith |
| 2010/0128002 A1 | 5/2010 | Stacy et al. |
| 2010/0153891 A1 | 6/2010 | Vaananen et al. |
| 2010/0164959 A1 | 7/2010 | Brown et al. |
| 2010/0220065 A1 | 9/2010 | Ma |
| 2010/0271325 A1 | 10/2010 | Conte et al. |
| 2010/0289807 A1 | 11/2010 | Yu et al. |
| 2010/0295807 A1 | 11/2010 | Xie et al. |
| 2010/0308844 A1 | 12/2010 | Day et al. |
| 2010/0309714 A1 | 12/2010 | Meade |
| 2010/0315373 A1 | 12/2010 | Steinhauser et al. |
| 2010/0321310 A1 | 12/2010 | Kim et al. |
| 2010/0321319 A1 | 12/2010 | Hefti et al. |
| 2010/0323467 A1* | 12/2010 | Vaganov ............... G01L 1/18 438/53 |
| 2010/0328229 A1 | 12/2010 | Weber et al. |
| 2010/0328230 A1 | 12/2010 | Faubert et al. |
| 2011/0001723 A1 | 1/2011 | Fan |
| 2011/0006980 A1 | 1/2011 | Taniguchi et al. |
| 2011/0007008 A1 | 1/2011 | Algreatly |
| 2011/0012848 A1 | 1/2011 | Li et al. |
| 2011/0018820 A1 | 1/2011 | Huitema et al. |
| 2011/0032211 A1 | 2/2011 | Christoffersen |
| 2011/0039602 A1 | 2/2011 | McNamara et al. |
| 2011/0050628 A1 | 3/2011 | Homma et al. |
| 2011/0050630 A1 | 3/2011 | Ikeda |
| 2011/0057899 A1 | 3/2011 | Sleeman et al. |
| 2011/0063248 A1 | 3/2011 | Yoon |
| 2011/0113881 A1 | 5/2011 | Suzuki |
| 2011/0128250 A1 | 6/2011 | Murphy et al. |
| 2011/0141052 A1 | 6/2011 | Bernstein et al. |
| 2011/0141053 A1 | 6/2011 | Bulea et al. |
| 2011/0187674 A1 | 8/2011 | Baker et al. |
| 2011/0209555 A1 | 9/2011 | Ahles et al. |
| 2011/0227836 A1 | 9/2011 | Li et al. |
| 2011/0242014 A1 | 10/2011 | Tsai et al. |
| 2011/0267181 A1 | 11/2011 | Kildal |
| 2011/0267294 A1 | 11/2011 | Kildal |
| 2011/0273396 A1 | 11/2011 | Chung |
| 2011/0291951 A1 | 12/2011 | Tong |
| 2011/0298705 A1 | 12/2011 | Vaganov |
| 2011/0308324 A1 | 12/2011 | Gamage et al. |
| 2012/0032907 A1 | 2/2012 | Koizumi et al. |
| 2012/0032915 A1 | 2/2012 | Wittorf |
| 2012/0038579 A1 | 2/2012 | Sasaki |
| 2012/0044169 A1 | 2/2012 | Enami |
| 2012/0044172 A1 | 2/2012 | Ohki et al. |
| 2012/0050159 A1 | 3/2012 | Yu et al. |
| 2012/0050208 A1 | 3/2012 | Dietz |
| 2012/0056837 A1 | 3/2012 | Park et al. |
| 2012/0060605 A1 | 3/2012 | Wu et al. |
| 2012/0062603 A1 | 3/2012 | Mizunuma et al. |
| 2012/0068946 A1 | 3/2012 | Tang et al. |
| 2012/0068969 A1 | 3/2012 | Bogana et al. |
| 2012/0081327 A1 | 4/2012 | Heubel et al. |
| 2012/0086659 A1 | 4/2012 | Perlin et al. |
| 2012/0092250 A1 | 4/2012 | Hadas et al. |
| 2012/0092279 A1 | 4/2012 | Martin |
| 2012/0092294 A1 | 4/2012 | Ganapathi et al. |
| 2012/0092299 A1 | 4/2012 | Harada et al. |
| 2012/0092324 A1 | 4/2012 | Buchan et al. |
| 2012/0105358 A1 | 5/2012 | Momeyer et al. |
| 2012/0105367 A1 | 5/2012 | Son et al. |
| 2012/0113061 A1 | 5/2012 | Ikeda |
| 2012/0127088 A1 | 5/2012 | Pance et al. |
| 2012/0127107 A1 | 5/2012 | Miyashita et al. |
| 2012/0139864 A1 | 6/2012 | Sleeman et al. |
| 2012/0144921 A1 | 6/2012 | Bradley et al. |
| 2012/0146945 A1 | 6/2012 | Miyazawa et al. |
| 2012/0146946 A1 | 6/2012 | Wang et al. |
| 2012/0147052 A1 | 6/2012 | Homma et al. |
| 2012/0154315 A1 | 6/2012 | Aono |
| 2012/0154316 A1 | 6/2012 | Kono |
| 2012/0154317 A1 | 6/2012 | Aono |
| 2012/0154318 A1 | 6/2012 | Aono |
| 2012/0154328 A1 | 6/2012 | Kono |
| 2012/0154329 A1 | 6/2012 | Shinozaki |
| 2012/0154330 A1 | 6/2012 | Shimizu |
| 2012/0162122 A1 | 6/2012 | Geaghan |
| 2012/0169609 A1 | 7/2012 | Britton |

(56) References Cited

U.S. PATENT DOCUMENTS

| | | |
|---|---|---|
| 2012/0169617 A1 | 7/2012 | Mäenpää |
| 2012/0169635 A1 | 7/2012 | Liu |
| 2012/0169636 A1 | 7/2012 | Liu |
| 2012/0188181 A1 | 7/2012 | Ha et al. |
| 2012/0194460 A1 | 8/2012 | Kuwabara et al. |
| 2012/0194466 A1 | 8/2012 | Posamentier |
| 2012/0200526 A1 | 8/2012 | Lackey |
| 2012/0204653 A1 | 8/2012 | August et al. |
| 2012/0205165 A1 | 8/2012 | Strittmatter et al. |
| 2012/0218212 A1 | 8/2012 | Yu et al. |
| 2012/0286379 A1 | 11/2012 | Inoue |
| 2012/0319987 A1 | 12/2012 | Woo |
| 2012/0327025 A1 | 12/2012 | Huska et al. |
| 2013/0038541 A1 | 2/2013 | Bakker |
| 2013/0093685 A1 | 4/2013 | Kalu et al. |
| 2013/0096849 A1 | 4/2013 | Campbell et al. |
| 2013/0140944 A1 | 6/2013 | Chen et al. |
| 2013/0341741 A1 | 12/2013 | Brosh |
| 2013/0341742 A1* | 12/2013 | Brosh .................. B81B 3/0021 257/419 |
| 2014/0007705 A1 | 1/2014 | Campbell et al. |
| 2014/0028575 A1 | 1/2014 | Parivar et al. |
| 2014/0055407 A1 | 2/2014 | Lee et al. |
| 2014/0367811 A1 | 12/2014 | Nakagawa et al. |
| 2016/0332866 A1 | 11/2016 | Brosh et al. |
| 2017/0234744 A1 | 8/2017 | Tung et al. |

FOREIGN PATENT DOCUMENTS

| | | |
|---|---|---|
| DE | 102010012441 | 9/2011 |
| JP | 2004-156937 | 6/2004 |
| JP | 2010147268 A | 7/2010 |
| WO | 2004/113859 | 12/2004 |
| WO | 2007/139695 | 12/2007 |
| WO | 2013/067548 A1 | 5/2013 |

OTHER PUBLICATIONS

Nesterov, V., et al., "Modelling and investigation of the silicon twin design 3D micro probe," Journal of Micromechanics and Microengineering, vol. 15, 2005, pp. 514-520.

International Search Report and Written Opinion, dated Sep. 8, 2016, received in connection with corresponding International Patent Application No. PCT/US2016/036902.

Extended European Search Report issued in corresponding application EP16808379.8 dated Jan. 7, 2019.

* cited by examiner

RUGGEDIZED WAFER LEVEL MEMS FORCE SENSOR WITH A TOLERANCE TRENCH

CROSS-REFERENCE TO RELATED APPLICATIONS

This application claims the benefit of U.S. Provisional Patent Application No. 62/173,420, filed on Jun. 10, 2015, entitled "RUGGEDIZED WAFER LEVEL MEMS FORCE SENSOR WITH A TOLERANCE TRENCH," the disclosure of which is expressly incorporated herein by reference in its entirety.

STATEMENT REGARDING FEDERALLY FUNDED RESEARCH

This invention was made with government support under SBIR Award No. 1353450 awarded by the U.S. National Science Foundation. The government has certain rights in the invention.

BACKGROUND

Conventional technology microelectromechanical (MEMS) force dies are based on linking the applied force to the center of a sensing diaphragm having four piezoresistive strain gauges formed thereon. The contact pads are positioned around the diaphragm, which makes conventional MEMS force dies relatively large. In addition, conventional MEMS force dies are fragile, lack the robustness of other force sensing technologies (e.g., force sensitive resistors), and are susceptible to debris from the external environment. Accordingly, there is a need in the pertinent art for a small, low-cost, silicon force sensor that may be sealed and that is robust against mechanical overload.

SUMMARY

An example MEMS force sensor is described herein. The MEMS force sensor can include a cap for receiving an applied force and a sensor bonded to the cap. A trench and a cavity can be formed in the sensor. The trench can be formed along at least a portion of a peripheral edge of the sensor. The cavity can define an outer wall and a flexible sensing element, and the outer wall can be arranged between the trench and the cavity. The cavity can be sealed between the cap and the sensor. The sensor can also include a sensor element formed on the flexible sensing element. The sensor element can change an electrical characteristic in response to deflection of the flexible sensing element.

Additionally, a thickness of at least a portion of the outer wall can optionally be determined by a size or width of the trench. Alternatively or additionally, the thickness of the portion of the outer wall can optionally be configured to provide a predetermined level of force-measurement sensitivity. Alternatively or additionally, the trench can optionally be configured to isolate the portion of the outer wall from a dicing blade.

Optionally, the trench and the cavity can be etched from the sensor, and a depth of the trench and a depth of the cavity can be approximately equal.

Alternatively or additionally, the sensor and the cap can optionally be bonded along at least a portion of the outer wall.

Optionally, the cavity can define a boss that extends from the outer wall inwardly toward a center of the sensor. Additionally, the sensor and the cap can optionally be bonded along at least a portion of the boss.

Alternatively or additionally, the MEMS force sensor can include a gap formed in at least one of the cap or the sensor. Optionally, a depth of the gap can be configured to limit an amount of the deflection of the flexible sensing element.

Alternatively or additionally, the sensor can have a center spaced from the peripheral edge, and the gap can overlap with the center of the sensor.

Alternatively or additionally, the cavity can include a volume entirely enclosed between the cap and the sensor.

Alternatively or additionally, the cavity can define a plurality of flexible sensing elements.

A method for manufacturing a MEMS force sensor is also described herein. The method can include providing a substrate having a first surface and a second surface opposite to the first surface, forming at least one sensor element on the first surface of the substrate, and inverting the substrate to expose the second surface of the substrate. The method can also include etching the second surface of the substrate to form a cavity, where the cavity defines an outer wall and at least one flexible sensing element, and etching the second surface of the substrate to form a trench. The method can further include bonding the second surface of the substrate to a protective substrate, where the cavity is sealed between the bonded substrate and protective substrate, and dicing the bonded substrate and protective substrate along a line intersecting the trench. The trench can be configured to isolate a portion of the outer wall from a dicing blade.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for an example MEMS force sensor, it will become evident to those skilled in the art that the implementations are not limited thereto.

Figure 1:
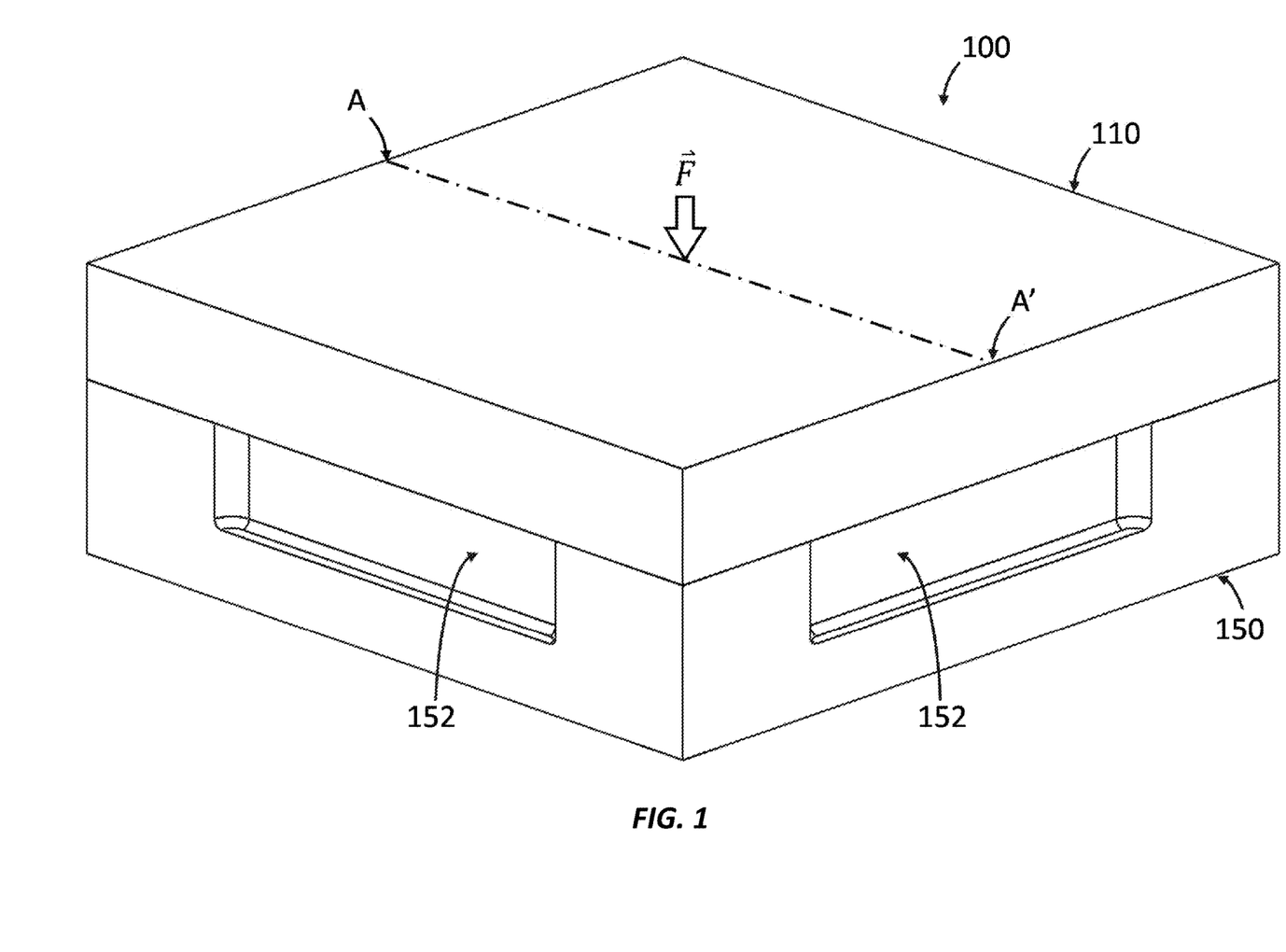
FIG. 1 is an isometric view of an example MEMS force sensor.
Figure 2A:
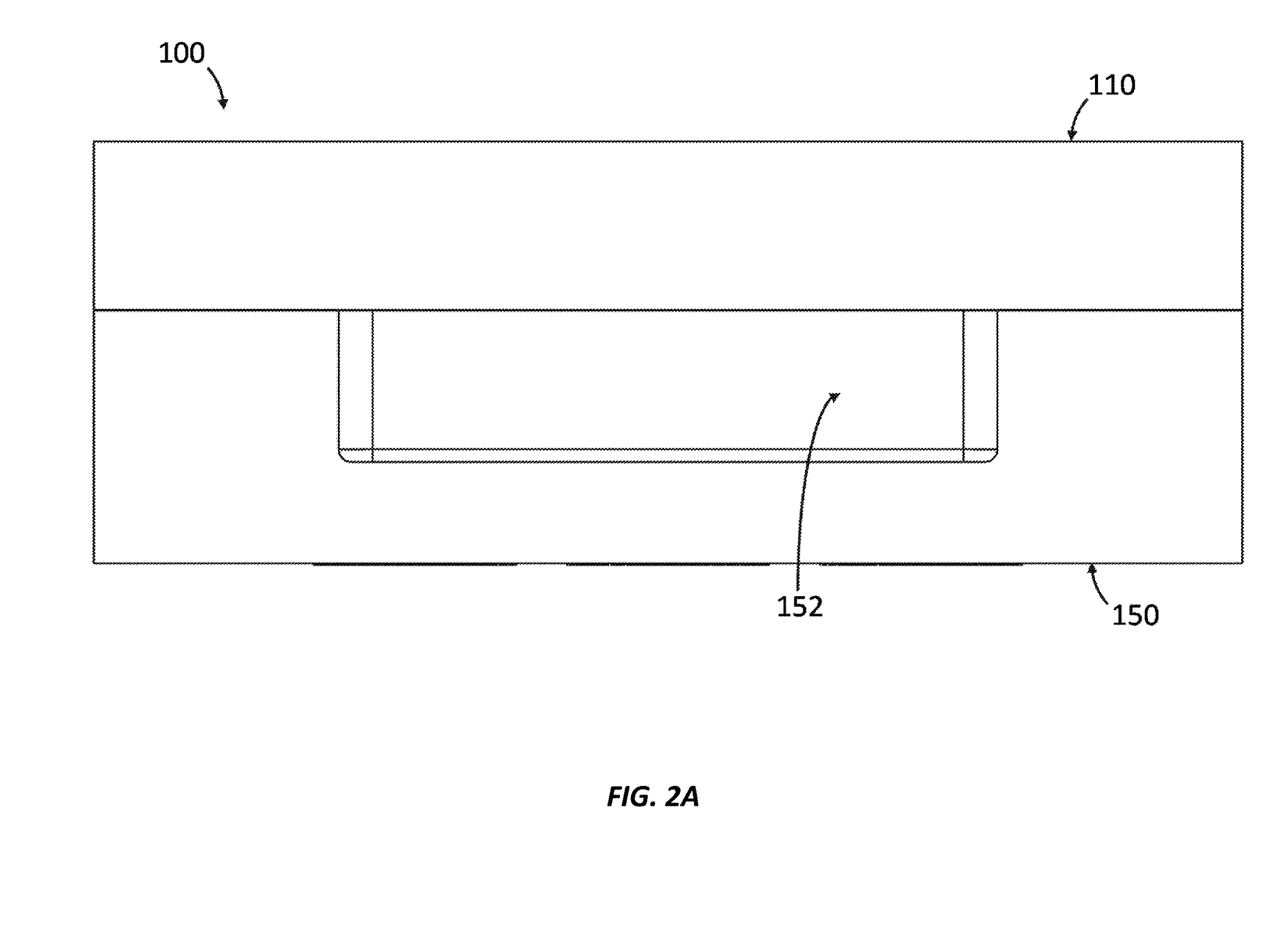
FIG. 2A is a side view of the example MEMS force sensor of FIG. 1.
Figure 2B:
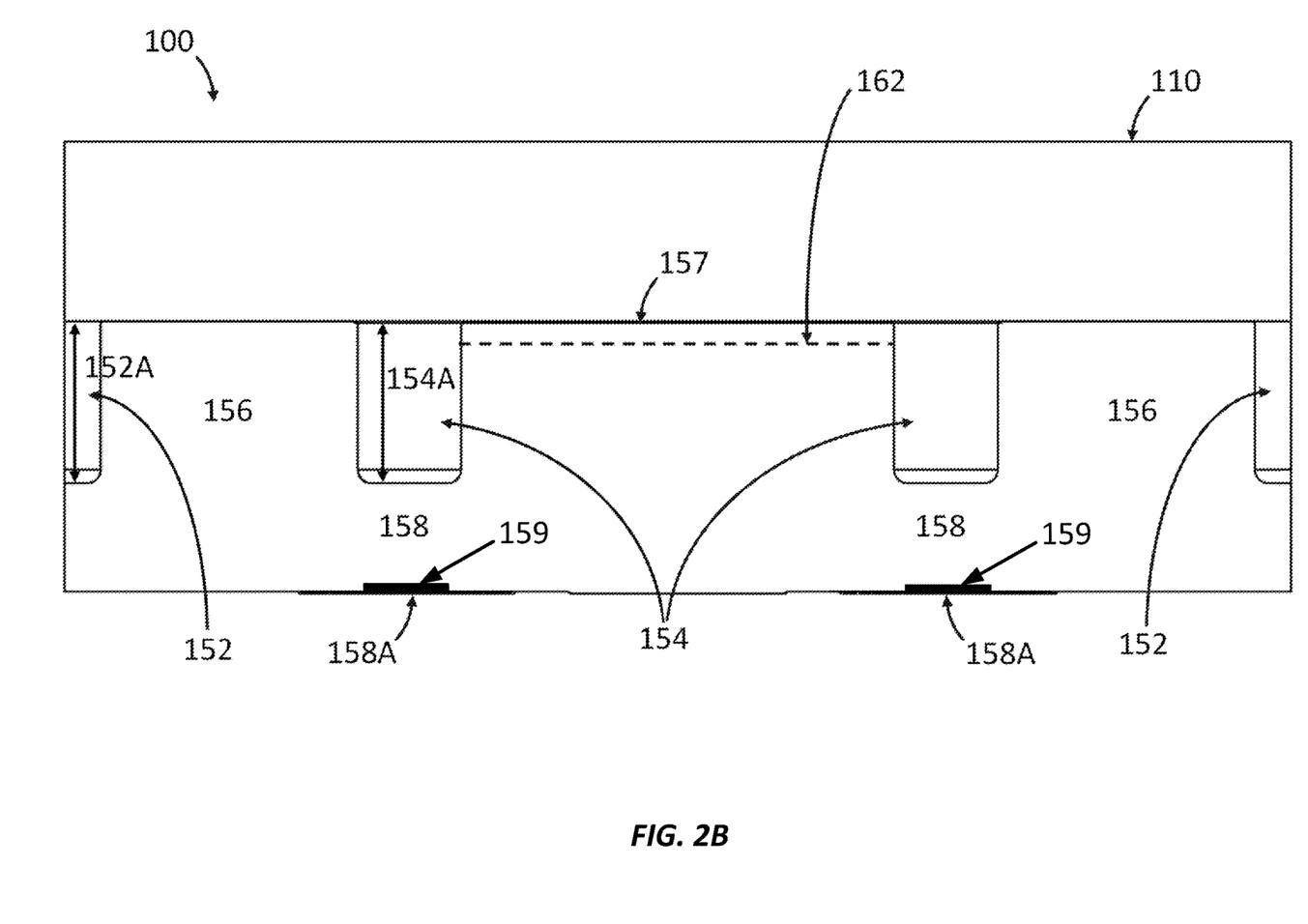
FIG. 2B is a cross-sectional view of the example MEMS force sensor of FIG. 1 along line A-A'.
Figure 3:
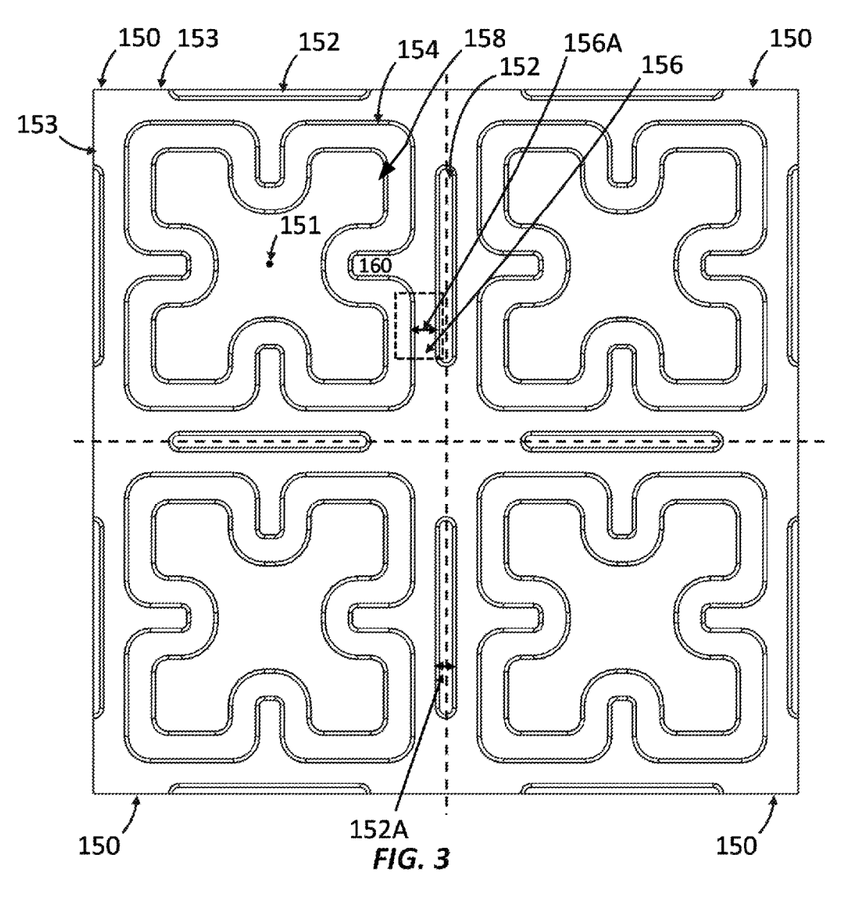
FIG. 3 is a top view of a wafer section with a 2×2 array of sensors.

Referring now to FIGS. 1-3, an example MEMS force sensor 100 is described. The MEMS force sensor 100 can include a cap 110 and a sensor 150 bonded to the cap 110. The cap 110 is configured to receive an applied force ($\vec{F}$), which is transferred to the sensor 150. The cap 110 can optionally be a glass (e.g., borosilicate glass) spacer or a silicon spacer. The sensor 150 can optionally be a silicon sensor. Optionally, the sensor 150 (and its components such as, for example, the boss, flexible sensing element(s), etc.) is a single continuous piece of material, i.e., the sensor 150 is monolithic. It should be understood that this disclosure contemplates that the cap 110 and/or the sensor 150 can be made from materials other than those described above, which are provided as examples.

The MEMS force sensor 100 can define a center 151 and a peripheral edge 153. The center 151 is arranged in the central area of the MEMS force sensor 100, and the peripheral edge 153 is spaced apart from the center 151 and arranged along the outer edge of the MEMS force sensor 100. In the implementations described herein, the cap 110 and the sensor 150 can be bonded at one or more points between the cap 110 and the sensor 150 and in proximity to the peripheral edge 153 of the sensor 150. For example, the cap 110 and the sensor 150 can be bonded together at one or more points or surfaces of an outer wall (e.g., outer wall 156) and/or a boss (e.g., boss 160) of the sensor 150. In other words, the bonding area(s) between the cap 110 and the sensor 150 is arranged near outer portion of the MEMS force sensor 100 as opposed to near the center portion of the MEMS force sensor 100. Example MEMS force sensors where a cap and sensor are bonded in peripheral or outer regions of the sensor are described in U.S. Patent Application Publication No. 2013/0341741 to Brosh, filed Jun. 21, 2013 and entitled "Ruggedized MEMS Force Die," and U.S. Patent Application Publication No. 2013/0341742 to Brosh, filed Jun. 21, 2013 and entitled "Wafer Level MEMS Force Dies," the disclosures of which are incorporated herein by reference in their entireties. This disclosure contemplates that the cap 110 and the sensor 150 can be bonded using techniques known in the art including, but not limited to, silicon fusion bonding, anodic bonding, glass frit, thermocompression, and eutectic bonding.

The sensor 150 can include a trench 152 (e.g., a tolerance trench) and a cavity 154 formed therein. The trench 152 and the cavity 154 can optionally be formed by etching a surface of the sensor 150. Optionally, the trench 152 and the cavity 154 can be formed in the same etching step during the fabrication process. Alternatively, the trench 152 and the cavity 154 can be formed in different etching steps during the fabrication process. Optionally, a depth 152A of the trench 152 in the sensor 150 and a depth 154A of the cavity 154 in the sensor 150 can be approximately equal (e.g., as shown in FIG. 2B). Alternatively, the respective depths of the trench 152 and the cavity 154 in the sensor 150 may not be equal. It should be understood that the respective depths of the trench 152 and the cavity 154 refer to how deep each extends into the sensor 150 (e.g., how much sensor material is removed during the fabrication process).

Figure 4:
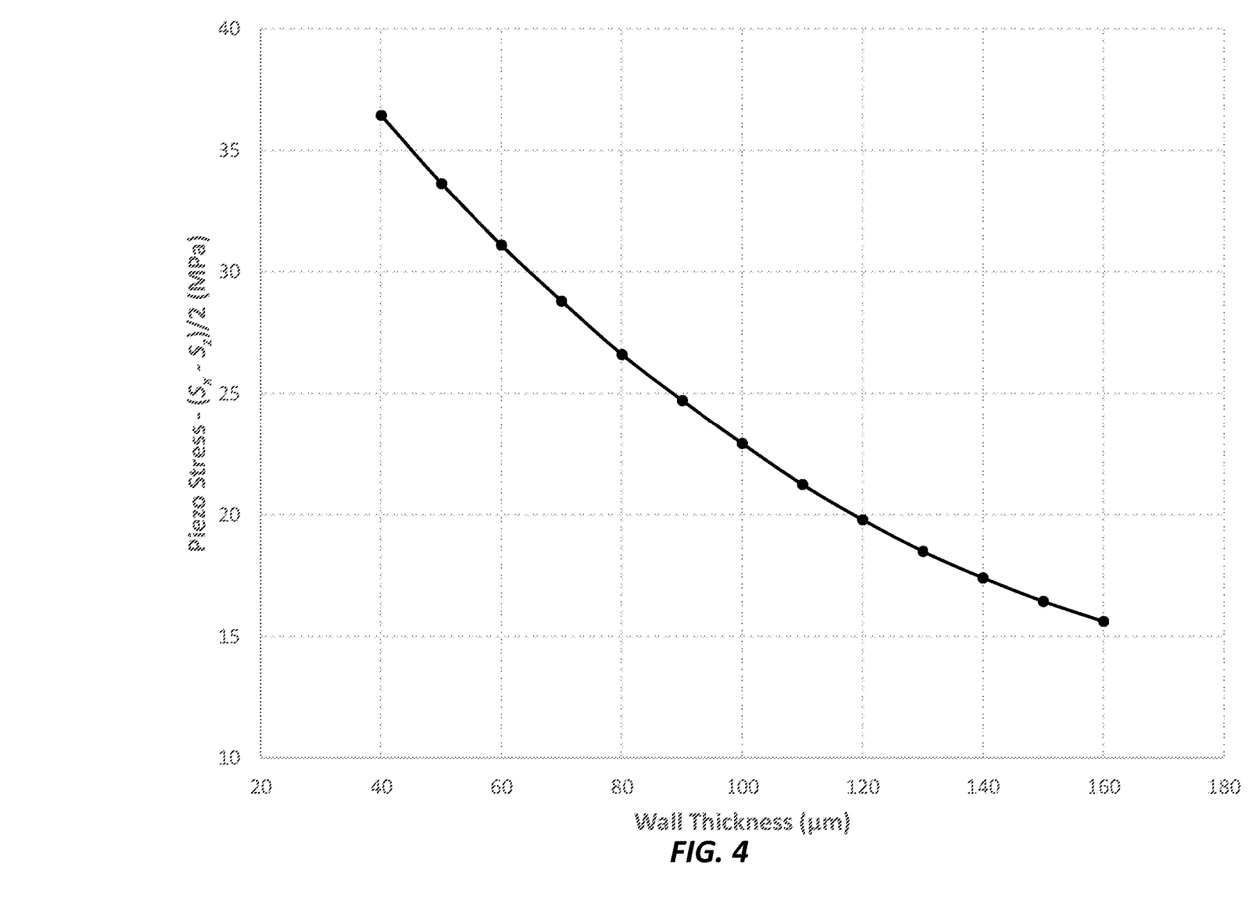
FIG. 4 is a graph illustrating MEMS force sensor sensitivity versus wall thickness.

The trench 154 can be formed along at least a portion of the peripheral edge 153 of the sensor 150 (e.g., as shown in FIG. 3). As shown in the dotted box of FIG. 3, a thickness 156A of at least a portion of the outer wall 156 can optionally be determined by a size (e.g., a width) of the trench 152. In particular, the size or width of the trench 152 is shown by arrow 152A in FIG. 3. As shown in FIG. 3, trenches are arranged between adjacent sensors 150 on the wafer and provide tolerance during dicing. If the size or width of the trench 152 increases (e.g., gets larger or wider), then the thickness 156A decreases. Conversely, if the size or width of the trench 152 decreases (e.g., gets smaller or narrower), then the thickness 156A increases. By controlling the width of the trench 152, it is possible to precisely select the thickness 156A of the portion of the outer wall 156, for example, to provide a predetermined level of force-measurement sensitivity. The thickness 156A of the portion of the outer wall 156 is related to the measurement sensitivity of the MEMS force sensor. An example plot of MEMS force sensor sensitivity versus wall thickness is shown in FIG. 4. As shown in FIG. 4, measurement sensitivity of the MEMS force sensor improves as wall thickness (e.g., thickness 156A of the portion of the outer wall 156 in FIG. 3) decreases. FIG. 4 is provided only as an example demonstrating one example relationship between sensitivity and wall thickness for an example MEMS force sensor and is not intended to be limiting. The trench 152 isolates the portion of the outer wall 156 from a dicing blade. For example, when the wafer (or bonded sensor and protective wafers) is diced along the dashed lines of FIG. 3, the dicing blade slices through the trench 152. The trench 152 can accommodate the dicing blade. The thickness 156A of the portion of the outer wall 156 is therefore not effected by (e.g., varied, increased, decreased, etc.) the dicing blade and/or manufacturing tolerances of the dicing process. The size or width of the trench 152, which is shown by arrow 152A in FIG. 3, can be selected based on the size of the dicing blade, precision of the dicing process, desired outer wall thickness of the sensor, desired measurement sensitivity of the MEMS force sensor, and/or combinations thereof.

The cavity 154 can optionally form a clover-leaf pattern in the sensor 150 (e.g., as shown in FIG. 3). The cavity 154 can define an outer wall 156 and at least one flexible sensing element 158. Optionally, the cavity 154 can define a plurality of outer walls and/or a plurality of flexible sensing elements. Example MEMS force sensors having a plurality of flexible sensing elements are described in U.S. Patent Application Publication No. 2013/0341741 to Brosh, filed Jun. 21, 2013 and entitled "Ruggedized MEMS Force Die," and U.S. Patent Application Publication No. 2013/0341742 to Brosh, filed Jun. 21, 2013 and entitled "Wafer Level MEMS Force Dies," the disclosures of which are incorporated herein by reference in their entireties. The outer wall 156 can be arranged between the trench 152 and the cavity 154 (e.g., as shown in the dashed box of FIG. 3). Optionally, the cavity 154 can define a boss 160 (e.g., a protruding portion), for example, that extends from the outer wall 156 inwardly toward the center 151 of the sensor 150. As described above, the sensor 150 can be bonded to the cap 110 at one or more points or surfaces of the outer wall 156. Alternatively or additionally, the sensor 150 can be bonded to the cap 110 at one or more points or surfaces of the boss 160. In this way, the bonded area(s) are arranged in proximity to the peripheral edge 153 of the sensor 150 as opposed to in proximity to the center 151 of the sensor 150. As noted above, example MEMS force sensors where a cap and sensor are bonded in peripheral or outer regions of the sensor are described in U.S. Patent Application Publication No. 2013/0341741 to Brosh, filed Jun. 21, 2013 and entitled "Ruggedized MEMS Force Die," and U.S. Patent Application Publication No. 2013/0341742 to Brosh, filed Jun. 21, 2013 and entitled "Wafer Level MEMS Force Dies," the disclosures of which are incorporated herein by reference in their entireties. This allows the bonded area(s) to take up a larger percentage of the surface area between the cap 110 and the sensor 150, which results in a MEMS force sensor with improved strength and robustness. Additionally, the cavity 154 can be sealed between the cap 110 and the sensor 150 when the cap 110 and the sensor 150 are bonded together. In other words, the cavity 154 (e.g., a sealed cavity or cavity sealed from the external environment) can define a volume entirely enclosed by the cap 110 and the sensor 150, even after the MEMS force sensor is diced. Example sealed MEMS force sensors are described in WO 2015/106246, filed Jan. 13, 2015 and entitled "Miniaturized and Ruggedized Wafer Level MEMS Force Sensors," the disclosure of which is incorporated herein by reference in its entirety. This is unlike the trench 152, which is not sealed from the external environment after dicing.

The sensor 150 can also include a sensor element 159 formed on the flexible sensing element 158. For example, the sensor element 159 can be formed on the flexible sensing element 158 adjacent to the portion of the outer wall 156 having precisely controlled wall thickness (e.g., on a portion of the flexible sensing element within the dashed box of FIG. 3). Additionally, as described below, the sensor element 159 can be formed on a bottom surface of the flexible sensing element 158. Optionally, a plurality of sensor elements 159 can be formed on each flexible sensing element. The sensor element 159 can change an electrical characteristic (e.g., resistance, capacitance, charge, etc.) in response to deflection of the flexible sensing element 158. For example, a piezoresistive element can be deposited or implanted on a bottom surface 158A of the flexible sensing element 158 of the sensor 150. As strain is induced in the flexible sensing element 158 proportional to the applied force ($\vec{F}$), a localized strain is produced on the piezoresistive element, such that the piezoresistive element experiences compression, depending on its specific orientation. As the piezoresistive element compresses and tenses, its resistivity changes in opposite fashion. Accordingly, a Wheatstone bridge circuit including a plurality (e.g., four) piezoresistive elements (e.g., two of each orientation relative to strain) becomes unbalanced and produces a differential voltage across the positive signal terminal and the negative signal terminal. This differential voltage is directly proportional to the applied force ($\vec{F}$) on the cap 110 of the MEMS force sensor 100. This differential voltage can be measured through electrical terminals that are connected to external circuitry. The electrical terminals can optionally be solder bumps to allow flip-chip assembly. Although piezoresistive elements are provided as an example sensor element, this disclosure contemplates that the sensor element 159 can be any sensor element configured to change at least one electrical characteristic (e.g., resistance, charge, capacitance, etc.) based on an amount or magnitude of an applied force and can output a signal proportional to the amount or magnitude of the applied force (e.g., including, but not limited to, piezoelectric or capacitive sensors).

Alternatively or additionally, the MEMS force sensor 100 can include a gap 162 (e.g., an air gap) formed in at least one of the cap 110 or the sensor 150. For example, the gap 162 can be formed by etching a portion of the sensor 150 (e.g., as shown by the dashed line in FIG. 2B). Alternatively, the gap 162 can be formed by etching a portion of the cap 110. Alternatively, the gap 162 can be formed by etching a portion of the sensor 150 and a portion of the cap 110. Example MEMS force sensors where a gap is provided in a center region of the MEMS force sensor are described in U.S. Patent Application Publication No. 2013/0341741 to Brosh, filed Jun. 21, 2013 and entitled "Ruggedized MEMS Force Die," and U.S. Patent Application Publication No. 2013/0341742 to Brosh, filed Jun. 21, 2013 and entitled "Wafer Level MEMS Force Dies," the disclosures of which are incorporated herein by reference in their entireties. Optionally, a depth of the gap 162 can be configured to limit an amount of the deflection of the flexible sensing element 158. For example, the depth of the gap 162 can be from about 500 nm to about 2 μm. The gap 162 provides an overload stop by limiting the amount by which the flexible sensing element 158 can deflect such that the flexible sensing element does not mechanically fail due to the application of excessive force.

An example method for manufacturing a MEMS force sensor (e.g., MEMS force sensor 100 of FIGS. 1-3) is described below. A silicon wafer (e.g., substrate) having a first surface and a second surface opposite to the first surface can be provided. One or more sensor elements can be formed on the first surface of the silicon wafer. The sensor elements can be formed using any technique known in the art. For example, a fabrication process for forming sensor elements (e.g., piezoresistive elements) on a surface of a silicon wafer is described in U.S. Pat. No. 9,032,818 to Campbell et al., filed Jul. 3, 2013 and entitled "Microelectromechanical Load Sensor and Methods of Manufacturing the Same," the disclosure of which is incorporated herein by reference in its entirety. Alternatively or additionally, one or more electrical traces and/or one or more electromechanical connectors can be formed on the first surface of the silicon wafer. It should be understood that the traces and/or connectors can be used to mechanically and/or electrically couple the MEMS force sensor to an external device or circuit.

The silicon wafer can be inverted to expose the second surface, i.e., the opposite surface, of the silicon wafer. A trench (e.g., trench 152 of FIGS. 1-3) and/or a cavity (e.g., cavity 154 of FIGS. 1-3) can be provided on the second surface of the silicon wafer. The trench and/or the cavity can be formed using any technique known in the art including, but not limited to, etching techniques. For example, a fabrication process for etching features from a surface of a silicon wafer is described in U.S. Pat. No. 9,032,818 to Campbell et al., filed Jul. 3, 2013 and entitled "Microelectromechanical Load Sensor and Methods of Manufacturing the Same," the disclosure of which is incorporated herein by reference in its entirety. As described above, the trench and the cavity can be formed during the same or different steps of the fabrication process. Additionally, the respective depths of the trench and the cavity can optionally be about the same or different.

As described above, the cavity can form a pattern that defines an outer wall (e.g., outer wall 156 of FIGS. 2B and 3), at least one flexible sensing element (e.g., flexible sensing elements 158 of FIGS. 2B and 3), and/or at least one boss (e.g., boss 160 of FIG. 3). The sensor elements (e.g., sensor elements 159 of FIG. 2B) can optionally be formed on a bottom surface of the flexible sensing element (e.g., bottom surface 158A of FIG. 2B), i.e., on the first surface of the silicon wafer. Additionally, the trench can be arranged between sensors on the silicon wafer and provides tolerance during dicing. It should be understood that a plurality of trenches can be formed as shown in FIG. 3, i.e., between adjacent sensors. As described above, the size or width of the trench can be selected based on the size of the dicing blade, precision of the dicing process, desired outer wall thickness of the sensor, desired measurement sensitivity of the MEMS force sensor, and/or combinations thereof. The size or width of the trench is shown by arrow 152A in FIG. 3. If the size or width of the trench increases (e.g., gets larger or wider), then the thickness of the outer wall of the sensor decreases. Conversely, if the width of the trench decreases (e.g., gets smaller or narrower), then the thickness of the outer wall of the sensor increases. By controlling the width of the trench, it is possible to precisely select the thickness of the portion of the outer wall of the sensors, for example, to provide a predetermined level of force-measurement sensitivity.

The silicon wafer can be bonded to a protective wafer (e.g., silicon spacer or other material). It should be understood that the protective wafer forms cap 110 of FIGS. 1-2B. The silicon wafer and the protective wafer can be bonded using any technique known in the art including, but not limited to, silicon fusion bonding, anodic bonding, glass frit, thermo-compression, and eutectic bonding. As described above, the bonding area(s) are arranged near an outer portion of the sensor as opposed to near the center portion of the sensor. After the silicon wafer and the protective wafer are bonded, the bonded wafers are diced. As described above, each trench isolates the outer wall of each MEMS force sensor from a dicing blade. For example, when the wafers are diced along the dashed lines of FIG. 3, the dicing blade slices through the trench. The trench can accommodate the dicing blade. The thickness of the portion of the outer wall of the sensor is therefore not effected by (e.g., varied, increased, decreased, etc.) the dicing blade and/or manufacturing tolerances of the dicing process.

Optionally, a gap can be formed in at least one of the silicon wafer or the protective wafer. As described above, the gap can be formed in both the silicon and protective wafers or in one of the silicon or protective wafers. The gap can be formed using any technique known in the art including, but not limited to, etching techniques. For example, a fabrication process for etching features from a wafer is described in U.S. Pat. No. 9,032,818 to Campbell et al., filed Jul. 3, 2013 and entitled "Microelectromechanical Load Sensor and Methods of Manufacturing the Same," the disclosure of which is incorporated herein by reference in its entirety. A depth of the gap is configured to limit an amount of deflection of the flexible sensing element(s), e.g., provide overload protection by preventing mechanical failure of the flexible sensing element(s) due to excessive applied force. Additionally, as described above, the gap can be arranged to overlap with the center of the sensor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A microelectromechanical (MEMS) force sensor, comprising: a cap for receiving an applied force; a sensor bonded to the cap, the sensor comprising: a trench formed in the sensor along at least a portion of a peripheral edge of the sensor, and a cavity formed in the sensor, the cavity defining an outer wall and at least one flexible sensing element, the outer wall being arranged between the trench and the cavity, and the cavity being sealed between the cap and the sensor; and a sensor device formed on the at least one flexible sensing element, wherein the sensor device is configured to change an electrical characteristic in response to deflection of the at least one flexible sensing element.

2. The MEMS force sensor of claim 1, wherein a thickness of at least a portion of the outer wall is determined by a size of the trench.

3. The MEMS force sensor of claim 2, wherein the thickness of the portion of the outer wall is configured to provide a predetermined level of force-measurement sensitivity.

4. The MEMS force sensor of claim 1, wherein the trench is configured to isolate the portion of the outer wall from a dicing blade.

5. The MEMS force sensor of claim 1, wherein the trench and the cavity are etched from the sensor, and wherein a depth of the trench and a depth of the cavity are approximately equal.

6. The MEMS force sensor of claim 1, wherein the sensor and the cap are bonded along at least a portion of the outer wall.

7. The MEMS force sensor of claim 1, wherein the cavity further defines at least one boss that extends from the outer wall inwardly toward a center of the sensor.

8. The MEMS force sensor of claim 7, wherein the sensor and the cap are bonded along at least a portion of the at least one boss.

9. The MEMS force sensor of claim 1, further comprising a gap formed in at least one of the cap or the sensor, wherein a depth of the gap is configured to limit an amount of the deflection of the at least one flexible sensing element.

10. The MEMS force sensor of claim 9, wherein the sensor comprises a center and the peripheral edge, and wherein the gap overlaps with the center of the sensor.

11. The MEMS force sensor of claim 1, wherein the cavity comprises a volume entirely enclosed between the cap and the sensor.

12. The MEMS force sensor of claim 1, wherein the cavity further defines a plurality of flexible sensing elements.

* * * * *